US010690927B2

(12) United States Patent
Choi et al.

(10) Patent No.: US 10,690,927 B2
(45) Date of Patent: *Jun. 23, 2020

(54) HEAD-MOUNTED DISPLAY (71) Applicant: LG INNOTEK CO., LTD., Seoul (KR)

(72) Inventors: Yong Bok Choi, Seoul (KR); Sang Hun Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/441,192

(22) Filed: Jun. 14, 2019

(65) Prior Publication Data
US 2019/0293944 A1  Sep. 26, 2019

Related U.S. Application Data (63) Continuation of application No. 15/572,055, filed as application No. PCT/KR2016/004647 on May 3, 2016, now Pat. No. 10,359,633.

(30) Foreign Application Priority Data

May 4, 2015 (KR) .................. 10-2015-0062569

(51) Int. Cl.
*G09G 5/00* (2006.01)
*G02B 27/01* (2006.01)
(Continued)

(52) U.S. Cl.
CPC ........... *G02B 27/0172* (2013.01); *G02B 7/02* (2013.01); *G02B 26/0816* (2013.01);
(Continued)

(58) Field of Classification Search
CPC ...... G02B 7/02; G02B 26/08; G02B 26/0816; G02B 27/01; G02B 27/0172;
(Continued)

(56) References Cited

U.S. PATENT DOCUMENTS

| 5,671,087 A | 9/1997 | Kawamura |
| 5,748,375 A | 5/1998 | Yamana |

(Continued)

FOREIGN PATENT DOCUMENTS

| JP | 06-324284 A | 11/1994 |
| JP | 2012-063633 A | 3/2012 |

(Continued)

OTHER PUBLICATIONS

International Search Report in International Application No. PCT/KR2016/004647, filed May 3, 2016.
Office Action dated Nov. 16, 2018 in U.S. Appl. No. 15/572,055.

*Primary Examiner* — Joe H Cheng
(74) *Attorney, Agent, or Firm* — Saliwanchik, Lloyd & Eisenschenk (57) ABSTRACT

Embodiments relate to a head-mounted display which comprises: a light source; a lens part disposed on the optical axis of the light source; an image display part disposed apart from the lens part; a body disposed apart from the image display part, including a correction lens having protruding parts disposed at the center of the top and bottom surfaces thereof, and having a first hole, forming a path through which the protruding parts pass and the correction lens moves, disposed in a direction parallel to the optical axis; a correction lens position adjusting part having at least one second hole disposed therein which is coupled to the protruding parts passing through the first hole, surrounding the body, and moving in a direction parallel to the optical axis; and an image viewing part connected to the body.

20 Claims, 4 Drawing Sheets

(51) Int. Cl.
    *G02B 7/02*         (2006.01)
    *H04N 13/344*    (2018.01)
    *G02B 26/08*      (2006.01)

(52) U.S. Cl.
    CPC ....... *G02B 27/0176* (2013.01); *H04N 13/344* (2018.05); *G02B 2027/0154* (2013.01); *G02B 2027/0181* (2013.01)

(58) Field of Classification Search
    CPC ........ G02B 27/0176; G02B 2027/0154; G02B 2027/0181; H04N 13/344
    See application file for complete search history.

(56) References Cited

U.S. PATENT DOCUMENTS

| | | |
|---|---|---|
| 5,886,822 A | 3/1999 | Spitzer |
| 6,076,927 A | 6/2000 | Owens |
| 6,091,546 A | 7/2000 | Spitzer |
| 6,215,461 B1 | 4/2001 | Ishibashi et al. |
| 6,384,982 B1 | 5/2002 | Spitzer |
| 8,384,982 B2 | 2/2013 | Hakii |
| 2016/0202487 A1 | 7/2016 | Iguchi |
| 2016/0277725 A1 | 9/2016 | Ellsworth et al. |

FOREIGN PATENT DOCUMENTS

| | | |
|---|---|---|
| KR | 10-2003-0088217 A | 11/2003 |
| KR | 10-0327942 B1 | 9/2005 |
| KR | 10-2013-0037344 A | 4/2013 |
| KR | 10-2015-0024580 A | 8/2015 |
| WO | WO-99/23524 A1 | 5/1999 |

HEAD-MOUNTED DISPLAY

CROSS-REFERENCE TO RELATED APPLICATIONS

This application is a continuation of U.S. application Ser. No. 15/572,055, filed Nov. 6, 2017, now U.S. Pat. No. 10,359,633 B2; which is the U.S. national stage application of International Patent Application No. PCT/KR2016/004647, filed May 3, 2016, which claims priority to Korean Application No. 10-2015-0062569, filed May 4, 2015, the disclosures of each of which are incorporated herein by reference in their entirety.

TECHNICAL FIELD

Embodiments relate to a head-mounted display, and more particularly, to a head-mounted display which enables an image to be clearly viewed by compensating for the user's eyesight using a correction lens that is adjustable in position.

BACKGROUND ART

A head-mounted display (HMD) is a device with which a user can view an image while closely wearing the same over both of his/her eyes. The head-mounted display has been widely used because it is worn individually, has a small size, and provides a wide viewing angle.

In addition, the head-mounted display is a device that enlarges an image displayed on a display device, such as an LCD or a CRT, using an optical system and shows the enlarged image to the user. The head-mounted display needs to focus on a very short distance because an image screen thereof is located very close to the eyes, and also requires very precise optical devices in order to inhibit eye fatigue.

A conventional head-mounted display is disclosed in Korean Patent Laid-Open Publication No. 10-2013-0037344. The conventional head-mounted display is a wearable display system that displays an input image signal, and includes an object lens that enlarges the image signal, a diffractive lattice that diffracts the image signal enlarged via the object lens to a predetermined angle, a wave guide that propagates the signal diffracted by the diffractive lattice, and an eye lens that forms an image of the image signal propagated through the wave guide so as to allow a user to view the image. The conventional head-mounted display may obtain a high-magnification image by primarily enlarging an image to be displayed by a refractive lens and secondarily enlarging the image by an eye lens, and may maximize the user's visual field.

However, when a user wearing glasses wears the head-mounted display, the user may feel uncomfortable. Meanwhile, when a user with poor eyesight wears the head-mounted display only, the user may not view a clear image.

TECHNICAL OBJECT

Embodiments are devised to solve the problems described above, and an object of the embodiments is to provide a head-mounted display which may adjust the position of a correction lens so as to compensate for the user's eyesight.

Technical Solution

To achieve the object described above, an embodiment provides a head-mounted display including a body including a light source, a lens unit disposed on an optical axis of the light source, an image display unit disposed so as to be spaced apart from the lens unit, and a correction lens disposed so as to be spaced apart from the image display unit and having a protrusion disposed on a center of each of upper and lower surfaces thereof, the body being provided with a first hole, through which the protrusion passes so as to define a path along which the correction lens is moved, in such a manner that the first hole is formed in a direction parallel to the optical axis, a correction lens position adjustment unit having at least one second hole, into which the protrusion that has passed through the first hole is coupled, the correction lens position adjustment unit being configured to surround the body and to move in the direction parallel to the optical axis, and an image-viewing unit disposed so as to be connected to the body.

In the embodiment, the correction lens position adjustment unit may include an upper frame configured to surround a portion of an upper surface and a side surface of the body, and a lower frame configured to surround a lower surface of the body and a side surface of the upper frame, and the at least one second hole may include a second-first hole formed in the upper frame and a second-second hole formed in the lower frame.

In addition, the correction lens position adjustment unit may further include a coupling unit configured to couple the upper frame and the lower frame to each other, and the coupling unit may include a coupling protrusion disposed on a lower end portion of each of opposite side surfaces of the upper frame and configured to be inclined upward relative to the side surface of the upper frame and a coupling hole formed in each of opposite side surfaces of the lower frame so as to correspond to the coupling protrusion.

In addition, the lower frame may be provided with a stepped holding portion, which comes into contact with a lower end surface of the upper frame.

In addition, the head-mounted display may further include anti-pushing members disposed respectively on one end and a remaining end of the correction lens position adjustment unit in the direction parallel to the optical axis.

In addition, the correction lens position adjustment unit may further include a fixing unit configured to fix the correction lens position adjustment unit to the body.

In addition, the fixing unit may include a third hole formed in one side surface of the correction lens position adjustment unit and provided with screw-threads; and a fixing pin screwed into the third hole.

Meanwhile, the correction lens position adjustment unit may further include an anti-slip portion formed on upper and lower surfaces thereof and having a plurality of linear grooves formed in a direction orthogonal to the optical axis.

In addition, the correction lens may have negative refractive power.

In addition, the body may be provided with a stepped surface at a position at which the correction lens is disposed, and opposite edges of the correction lens may move along the stepped surface.

Another embodiment provides a head-mounted display including a light source, a lens unit disposed on an optical axis of the light source, an image display unit disposed so as to be spaced apart from the lens unit, an image-viewing unit disposed so as to be spaced apart from the image display unit, a correction lens disposed between the image display unit and the image-viewing unit, a body disposed in a direction parallel to the optical axis so that the light source, the lens unit, and the image display unit are sequentially disposed therein, and a correction lens position adjustment unit configured to surround the body and to move a position of the correction lens between the image display unit and the image-viewing unit.

In the embodiment, the correction lens may have a protrusion formed on each of upper and lower surfaces thereof, and the protrusion may pass through a first hole formed in the body in the direction parallel to the optical axis so as to move along the first hole.

In addition, the lens unit may include a first lens and a second lens.

In addition, the first lens and the second lens may include at least one spherical lens, or may include at least one aspherical lens.

In addition, the correction lens may have negative refractive power.

In addition, the correction lens position adjustment unit may further include a fixing unit configured to fix the correction lens position adjustment unit to the body.

In addition, the fixing unit may include a third hole formed in one side surface of the correction lens position adjustment unit and provided with screw-threads and a fixing pin screwed into the third hole.

A further embodiment provides a head-mounted display including a body in which a light source, a lens unit on an optical axis of the light source, an image display unit, and a correction lens are sequentially disposed, an image-viewing unit disposed so as to be spaced apart from the correction lens and to be connected to the body, and a correction lens position adjustment unit configured to surround the body and to move a position of the correction lens, wherein the correction lens position adjustment unit includes an anti-slip portion.

In addition, the anti-slip portion may have a plurality of linear grooves formed in upper and lower surfaces thereof in a direction orthogonal to the optical axis.

Advantageous Effects

According to the embodiments described above, by adjusting the position of a correction lens, it is possible to allow a user who has poor eyesight to view a clear image while compensating for the user's eyesight.

In addition, since the user who has poor eyesight can see an image by wearing only a head-mounted display without wearing glasses, the wearing comfort of the user may be improved, which may alleviate the discomfort of the user.

BEST MODE

Hereinafter, exemplary embodiments will be described in detail with reference to the accompanying drawings, in order to concretely realize the object described above.

Figure 1:
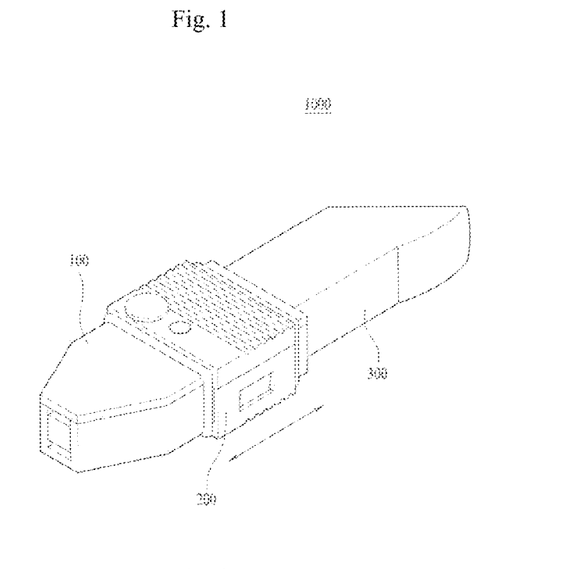
FIG. 1 is a perspective view illustrating a head-mounted display according to an embodiment.
Figure 2:
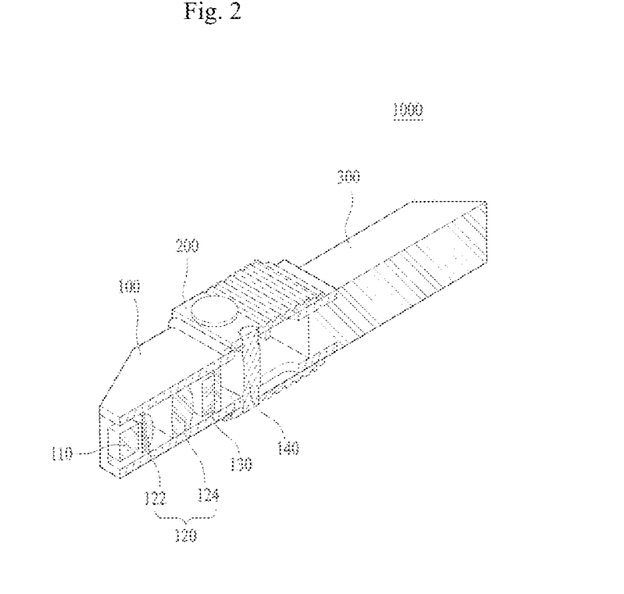
FIG. 2 is a perspective view illustrating the cross section taken along line A-A' of FIG. 1.
Figure 3:
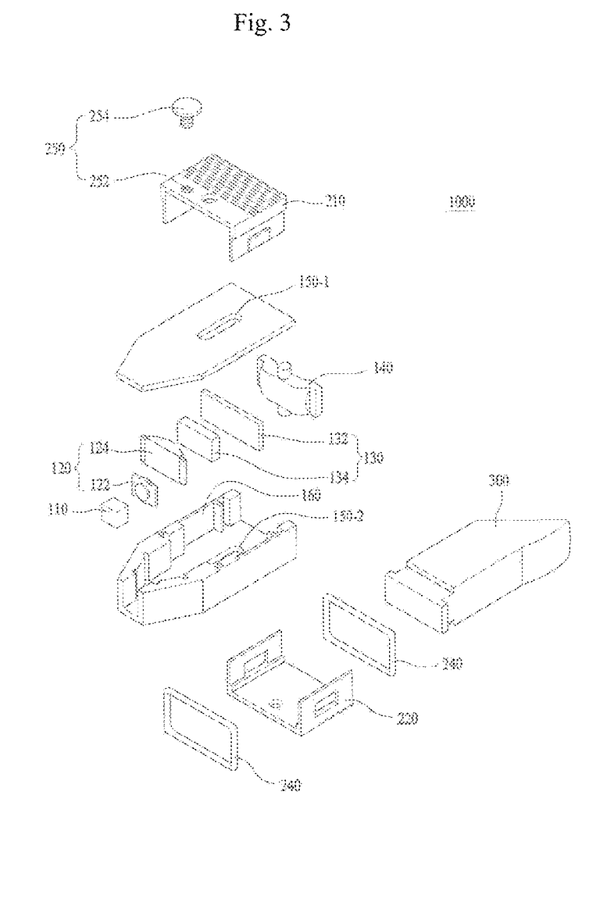
FIG. 3 is an exploded perspective view illustrating the head-mounted display according to the embodiment.

FIG. 1 is a perspective view illustrating a head-mounted display according to an embodiment, FIG. 2 is a perspective view illustrating the cross section taken along line A-A' of FIG. 1, and FIG. 3 is an exploded perspective view illustrating the head-mounted display according to the embodiment.

Referring to FIGS. 1 to 3, the head-mounted display 1000 according to the present embodiment includes a body 100, which includes a light source 110, a lens unit 120, an image display unit 130, and a correction lens 140, a correction lens position adjustment unit 200, and an image-viewing unit 300.

The light source 110, the lens unit 120, the image display unit 130, and the correction lens 140 may be disposed side by side in the body 100.

The light source 110 may be disposed in one end of the body 100, and may serve as a backlight of a display element of the image display unit, which will be described later. In addition, the light source 110 may be provided as a lamp including a light-emitting diode (LED), a cold cathode fluorescent light (CCFL) or the like, and may adjust the brightness of an image depending on the quantity of light of the lamp.

The lens unit 120 may be disposed on the optical axis of the light source 110 and may be located in front of the light source in the direction in which light travels so as to collect the light emitted from the light source 110 so that light having high illuminance may pass through the image display unit 130. In addition, the lens unit 120 may include a first lens 122 and a second lens 124, and the first lens 122 and the second lens 124 may be configured as a combination of lenses selected from among at least one spherical lens and at least one aspherical lens.

The image display unit 130 may be disposed on the optical axis of the light source 110 so as to be spaced apart from the lens unit 120, and may serve to emit light that forms an image. In addition, the image display unit 130 may include a display element 134 and a substrate 132 on which the display element 134 is mounted. In the embodiment, the display element 134 may be a light-transmitting liquid crystal display (LCD) coupled with a light source, but may be realized as any of various devices or elements, such as an organic light-emitting diode (OLED) that requires no light source.

The correction lens 140 may be disposed so as to be spaced apart from the image display unit 130, and may move between the image-viewing unit 300, which is connected to the body 100, and the image display unit 130.

Here, the correction lens 140 may have negative refractive power. The position of the correction lens 140 may be moved between the image display unit 130 and the image-viewing unit 300, which enables adjustment in the position of an image focus so that an image provided from the image display unit 130 is transferred as a clear image adjusted to compensate for the user's eyesight.

Next, the structure of the correction lens 140, which enables the movement of the correction lens 140 between the image-viewing unit 300 and the image display unit 130, will be described in detail.

Figure 4A:
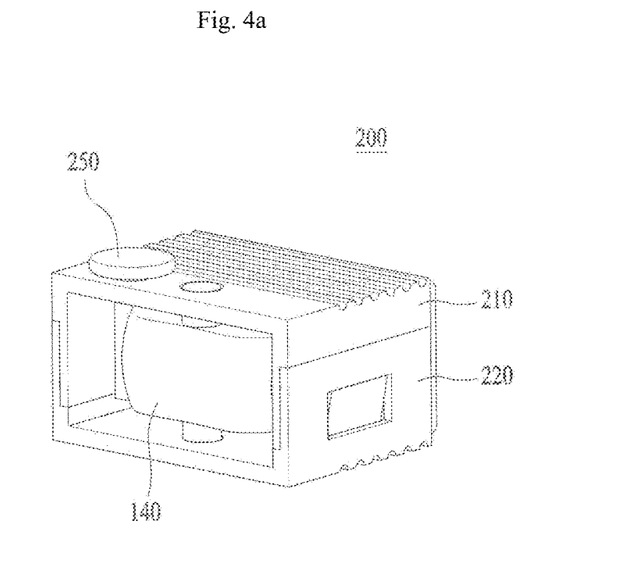
FIG. 4a is a perspective view illustrating a correction lens position adjustment unit according to the embodiment.
Figure 4B:
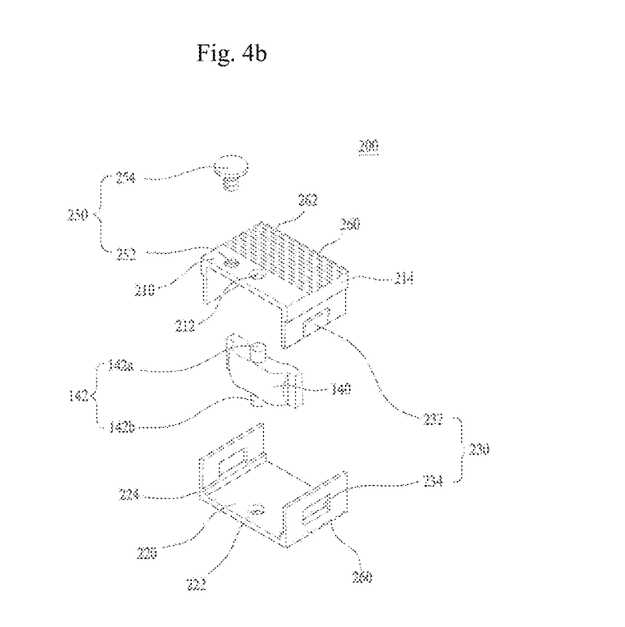
FIG. 4b is an exploded perspective view illustrating the correction lens position adjustment unit according to the embodiment.

FIG. 4a is a perspective view illustrating a correction lens position adjustment unit according to the embodiment, and FIG. 4b is an exploded perspective view illustrating the correction lens position adjustment unit according to the embodiment.

Referring to FIGS. 4a and 4b, protrusions 142 may be disposed on the center of the upper and lower surfaces of the correction lens 140. The protrusions 142 may include a first protrusion 142a formed on the upper surface of the correction lens 140 and a second protrusion 142b formed on the lower surface of the correction lens 140.

The first protrusion 142a and the second protrusion 142b may be formed in a cylindrical shape at vertically symmetrical positions.

The body 100 may have therein first holes 150, through which the protrusions 142 pass so as to define the path along which the correction lens 140 is movable. A first-first hole 150-1, through which the first protrusion 142a passes, and a first-second hole 150-2, through which the second protrusion 142b passes, may be respectively formed in the upper and lower surfaces of the body 100.

Here, the first-first hole 150-1 and the first-second hole 150-2 may be disposed in a direction parallel to the optical axis (the longitudinal direction of the body).

In order to allow the first protrusion 142a and the second protrusion 142b to move in the first-first hole 150-1 and the first-second hole 150-2, the respective widths of the first-first hole 150-1 and the first-second hole 150-2 may be greater than the respective diameters of the first protrusion 142a and the second protrusion 142b.

The first protrusion 142a and the second protrusion 142b described above may be coupled to the correction lens position adjustment unit 200 so that the position of the correction lens 140 is movable. The correction lens position adjustment unit 200 may surround the body 100 and may move in a direction parallel to the optical axis so as to adjust the position of the correction lens 140.

In addition, the correction lens position adjustment unit 200 may include an upper frame 210 having a "┌┐"-shaped cross section and a lower frame 220 having a "└┘"-shaped cross section.

In addition, the inner width of the upper frame 210 may be equal to the width of the body 100 so that the upper frame 210 is disposed so as to surround a portion of the upper surface and the side surface of the body 100. The lower frame 220 may be disposed so as to surround the lower surface of the body 100 and the side surface of the upper frame 210.

The correction lens position adjustment unit 200 may further include a coupling unit 230, which couples the upper frame 210 and the lower frame 220 to each other.

Here, the coupling unit 230 may include coupling protrusions 232, which are disposed on the lower end portions of opposite side surfaces of the upper frame 210 and coupling holes 234, which are formed in opposite side surfaces of the lower frame 220 so as to correspond to the respective coupling protrusions 232. In addition, each coupling protrusion 232 may be inclined upward relative to the side surface of the upper frame 210, and with the inclined surface of the coupling protrusion 232, the coupling protrusion may be easily coupled into the coupling hole 234 in the lower frame 220.

In addition, the upper end surface of the coupling protrusion 232 may have a thickness corresponding to the thickness of the sidewall of the lower frame 220. As such, when the coupling protrusion 232 is fitted into the coupling hole 234, the upper end surface of the coupling protrusion 232 may be brought into contact with the upper surface of the coupling hole 234, whereby the upper frame 210 and the lower frame 220 may be coupled to each other.

In addition, in order to inhibit the coupling protrusion 232 from being separated from the coupling hole 234, the lower frame 220 may be provided with a stepped holding portion 224, which is brought into contact with the lower end surface of the upper frame 210 when the coupling protrusion 232 is coupled into the coupling hole 234. In addition, the upper frame 210 may be provided with a second stepped holding portion 214, which has a height corresponding to the thickness of the sidewall of the lower frame 220.

The coupling unit 230 described above is configured to couple the upper frame 210 and the lower frame 220 to each other as the coupling protrusions 232 are fitted into the coupling holes 234, without limitation thereto.

Meanwhile, the correction lens position adjustment unit 200 may have one or more second holes 212 and 222, into which the protrusions 142 that have passed through the first holes 150 are coupled.

The second holes 212 and 222 may include a second-first hole 212 formed in the upper frame 210 and a second-second hole 222 formed in the lower frame 220.

In addition, the first protrusion 142a and the second protrusion 142b may be coupled respectively into the second-first hole 212 and the second-second hole 222. The second-first hole 212 and the second-second hole 222 may have a planar shape and size corresponding to those of the first protrusion 142a and the second protrusion 142b so that the first protrusion 142a and the second protrusion 142b are fitted and coupled into the second-first hole 212 and the second-second hole 222.

Thus, as illustrated in FIGS. 1 to 4b, the correction lens 140 may be coupled to the correction lens position adjustment unit 200 so that the position of the correction lens 140 may be adjusted between the image display unit 130 and the image-viewing unit 300 in a direction parallel to the optical axis along the second holes 212 and 222 formed in the body 100.

In addition, the correction lens position adjustment unit 200 may further include anti-pushing members 240, which inhibit the correction lens position adjustment unit 200 from being pushed onto the body 100 after the correction lens position adjustment unit 200 is moved to adjust the position of the correction lens 140 so as to compensate for the user's eyesight. The anti-pushing members 240 may be disposed respectively on one end and the other end of the correction lens position adjustment unit 200 in a direction parallel to the optical axis, and may be formed of a rubber material.

The anti-pushing members 240 may allow the correction lens position adjustment unit 200 to be moved when the user applies a certain force to the correction lens position adjustment unit 200, but may inhibit the correction lens position adjustment unit 200 from being slightly moved along the body once the movement of the correction lens position adjustment unit 200 has stopped.

In the embodiment, the anti-pushing members 240 may take the form of rings provided on one end and the other end of the correction lens position adjustment unit 200, but the material or form of the anti-pushing members is not limited thereto.

In addition, the correction lens position adjustment unit 200 may further include a fixing unit 250, which fixes the correction lens position adjustment unit 200 to the body 100.

The fixing unit 250 may include a third hole 252 formed in one side surface of the correction lens position adjustment unit 200 and a fixing pin 254 coupled to the third hole 252.

In the embodiment, the third hole 252 may be formed in one side of the upper surface of the upper frame 210 of the correction lens position adjustment unit 200. The third hole 252 may be provided with screw-threads so that the fixing pin 254 in the form of a bolt may be screwed into the third hole 252.

Thus, once the position of the correction lens 140 has been adjusted to compensate for the user's eyesight, the fixing pin 254 may be screwed into the third hole 252 so that the lower end surface of the fixing pin 254 presses the upper end surface of the body 100, whereby the correction lens position adjustment unit 200 may be fixed to the body 100. The structure of the fixing unit 250 is not limited thereto.

Meanwhile, the correction lens position adjustment unit 200 may further include an anti-slip portion 260, which inhibits the user's hand from slipping from the correction lens position adjustment unit 200 when the user moves the correction lens position adjustment unit 200. The anti-slip portion 260 may include a plurality of linear grooves 262, which is formed in the upper and lower surfaces of the correction lens position adjustment unit 200 in a direction orthogonal to the optical axis. However, the anti-slip portion 260 is not limited to this structure so long as it may inhibit the user's hand from slipping from the correction lens position adjustment unit 200 when the user moves the correction lens position adjustment unit.

The body 100 may have stepped surfaces 160 formed at the position at which the correction lens 140 is disposed, and opposite edges of the correction lens 140 may move along the stepped surfaces 160.

The image-viewing unit 300 may be disposed so as to be connected to the body 100. In addition, the image-viewing unit 300 may include a correction mirror (not illustrated), which changes the angle of the optical axis of an image provided from the correction lens 140 so as to reflect the image.

As described above, the correction lens 140 may adjust the focal distance of an image so as to compensate for the user's eyesight by being moved between the image display unit 130 and the image-viewing unit 300.

Figure 5A:
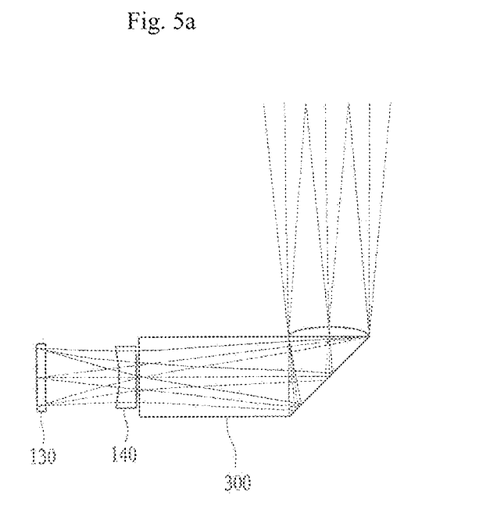
FIG. 5a is a view illustrating the position of a correction lens when a user is nearsighted.
Figure 5B:
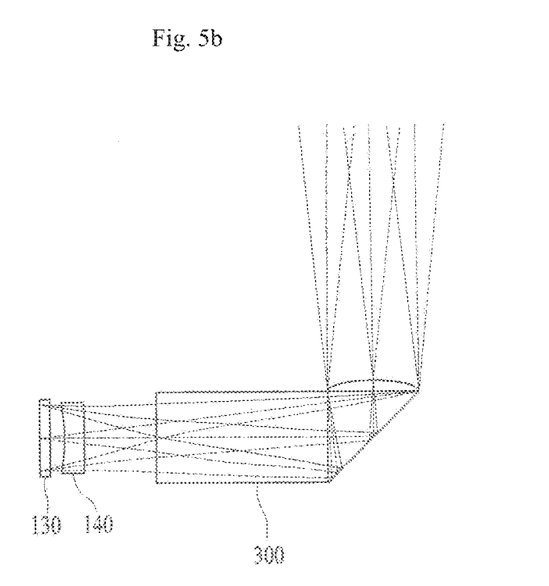
FIG. 5b is a view illustrating the position of a correction lens when a user is farsighted.

FIG. 5a is a view illustrating the position of the correction lens when the user is nearsighted, and FIG. 5b is a view illustrating the position of the correction lens when the user is farsighted.

Referring to FIGS. 5a and 5b, when the user is nearsighted, the focus is not on the retina, but forward of the retina. Therefore, the correction lens 140 may be moved from the image display unit 130 toward the image-viewing unit 300 to adjust the focal position of the image so that the image may be focused on the retina.

On the other hand, when the user is farsighted, the focus is not on the retina, but behind the retina. Therefore, the correction lens 140 may be moved from the image-viewing unit 300 toward the image display unit 130 to adjust the focal position of the image so that the image may be focused on the retina.

As described above, according to the embodiment, by adjusting the position of the correction lens disposed between the image display unit and the image-viewing unit, it is possible to allow the user who has poor eyesight to view a clear image by compensating for the user's eyesight. In addition, since the user who has poor eyesight can see an image by wearing only a head-mounted display without wearing glasses, the user is not required to wear both the glasses and the head-mounted display, which is uncomfortable, thereby improving wearing comfort.

Although embodiments have been described above, the above description is merely given by way of example and is not intended to limit the disclosure, and it will be apparent to those skilled in the art that various modifications and applications, which are not exemplified above, may be devised without departing from the essential characteristics of the embodiments. For example, the respective constituent elements described in the embodiments may be modified in various ways. In addition, differences associated with these modifications and alterations should be interpreted as being included in the scope of the disclosure defined by the accompanying claims.

MODE FOR INVENTION

Modes for the implementation of embodiments have sufficiently been described in the "best mode" described above.

INDUSTRIAL APPLICABILITY

Embodiments may realize a head-mounted display in which the position of a correction lens may be adjusted to compensate for the user's eyesight so as to allow a user who has poor eyesight to view an image by wearing only a head-mounted display without wearing glasses, resulting in improved wearing comfort.

The invention claimed is:

1. A head-mounted display comprising;
a body including: a light source; a lens unit disposed on an optical axis of the light source; an image display unit disposed so as to be spaced apart from the lens unit; and a correction lens disposed so as to be spaced apart from the image display unit and having a protrusion, the body being provided with a first hole, through which the protrusion passes so as to define a path along which the correction lens is moved;
a correction lens position adjustment unit having at least one second hole, into which the protrusion that has passed through the first hole is coupled, the correction lens position adjustment unit being configured to surround the body and to move in the direction parallel to the optical axis; and
an image-viewing unit disposed so as to be connected to the body,
wherein the correction lens position adjustment unit includes an upper frame and a lower frame.

2. The head-mounted display according to claim 1, wherein the protrusion is disposed on a center of each of upper and lower surfaces thereof.

3. The head-mounted display according to claim 1, wherein the correction lens is moved in such a manner that the first hole is formed in a direction parallel to the optical axis.

4. The head-mounted display according to claim 1,
wherein the upper frame is configured to surround a portion of an upper surface and a side surface of the body, and the lower frame is configured to surround a lower surface of the body and a side surface of the upper frame,
wherein the correction lens position adjustment unit includes a coupling unit configured to couple the upper frame and the lower frame to each other, and
wherein the at least one second hole includes:
a second-first hole formed in the upper frame; and
a second-second hole formed in the lower frame.

5. The head-mounted display according to claim 4, wherein the coupling unit includes:
a coupling protrusion disposed on a lower end portion of each of opposite side surfaces of the upper frame and configured to be inclined upward relative to the side surface of the upper frame; and a coupling hole formed in each of opposite side surfaces of the lower frame so as to correspond to the coupling protrusion.

6. The head-mounted display according to claim 1, wherein the lower frame is provided with a stepped holding portion, which comes into contact with a lower end surface of the upper frame.

7. The head-mounted display according to claim 1, comprising anti-pushing members disposed respectively on one end and a remaining end of the correction lens position adjustment unit in the direction parallel to the optical axis.

8. The head-mounted display according to claim 1, wherein the correction lens position adjustment unit includes a fixing unit configured to fix the correction lens position adjustment unit to the body.

9. The head-mounted display according to claim 8, wherein the fixing unit includes:
   a third hole formed in one side surface of the correction lens position adjustment unit and provided with screw-threads; and
   a fixing pin screwed into the third hole.

10. The head-mounted display according to claim 1, wherein the correction lens position adjustment unit includes an anti-slip portion formed on upper and lower surfaces thereof and has a plurality of linear grooves formed in a direction orthogonal to the optical axis.

11. The head-mounted display according to claim 1, wherein the correction lens has negative refractive power.

12. The head-mounted display according to claim 1, wherein the body is provided with a stepped surface at a position at which the correction lens is disposed, and opposite edges of the correction lens are disposed to move along the stepped surface.

13. A head-mounted display comprising:
   a light source;
   a lens unit disposed on an optical axis of the light source;
   an image display unit disposed so as to be spaced apart from the lens unit;
   an image-viewing unit disposed so as to be spaced apart from the image display unit;
   a correction lens disposed between the image display unit and the image-viewing unit;
   a body disposed in a direction parallel to the optical axis so that the light source, the lens unit, and the image display unit are sequentially disposed therein; and
   a correction lens position adjustment unit configured to surround the body and to move a position of the correction lens between the image display unit and the image-viewing unit,
   wherein the correction lens has a protrusion formed on each of upper and lower surfaces thereof, and the protrusion passes through a first hole formed in the body in the direction parallel to the optical axis so as to move along the first hole.

14. The head-mounted display according to claim 13, wherein the lens unit includes a first lens and a second lens, and wherein the first lens and the second lens include at least one spherical lens and at least one aspherical lens.

15. The head-mounted display according to claim 13, wherein the correction lens has negative refractive power.

16. The head-mounted display according to claim 13, wherein the correction lens position adjustment unit includes a fixing unit configured to fix the correction lens position adjustment unit to the body.

17. The head-mounted display according to claim 16, wherein the fixing unit includes:
   a third hole formed in one side surface of the correction lens position adjustment unit and provided with screw-threads; and
   a fixing pin screwed into the third hole.

18. The head-mounted display according to claim 17, wherein the body is provided with a stepped surface at a position at which the correction lens is disposed, and opposite edges of the correction lens are disposed to move along the stepped surface.

19. A head-mounted display comprising:
   a body in which a light source, a lens unit on an optical axis of the light source, an image display unit, and a correction lens are sequentially disposed;
   an image-viewing unit disposed so as to be spaced apart from the correction lens and to be connected to the body; and
   a correction lens position adjustment unit configured to move a position of the correction lens,
   wherein the correction lens position adjustment unit includes an anti-slip portion.

20. The head-mounted display according to claim 19, wherein the anti-slip portion has a plurality of linear grooves formed in upper and lower surfaces thereof in a direction orthogonal to the optical axis.

* * * * *